INVENTORS
FRED A. LENNON &
EMERY J. ZAHURANEC
BY Fay & Fay
ATTORNEYS

INVENTORS
FRED A. LENNON &
EMERY J. ZAHURANEC
BY Fay & Fay
ATTORNEYS

United States Patent Office 3,103,373
Patented Sept. 10, 1963

3,103,373
CONTROLLED PHASE SEQUENTIAL
GRIPPING DEVICE
Fred A. Lennon, Chagrin Falls, and Emery J. Zahuranec, Bedford, Ohio, assignors to Crawford Fitting Company, Cleveland, Ohio, a corporation of Ohio
Filed June 29, 1961, Ser. No. 120,682
7 Claims. (Cl. 285—342)

This invention concerns a controlled phase sequential gripping device particularly adapted for use in coupling tubes, positioning thermocouples and the like.

In its broadest sense, the device comprises a body having a passageway therethrough to receive a generally cylindrical elongated male member such as a tube or thermocouple. The passageway has a tapered mouth providing an annular camming surface against which a generally frusto-conical annular ferrule adapted to be fitted over the cylindrical member is seated. A flanged annular back ferrule, adapted to be fitted over the cylindrical member rearwardly of the front ferrule has a forward generally frusto-conical end portion received within an annular tapered camming mouth provided at the rear of the front ferrule.

Suitable means, such as a coupling nut threaded upon the body, is utilized to drive the back ferrule against the tapered mouth of the front ferrule and, by force transmitted through the back ferrule, to drive the front ferrule into the tapered mouth of the body. As the ferrules are driven forwardly, they move along the surfaces of the tapered mouths and are cammed radially inwardly against the external surface of the male member.

The movement of the ferrules swages the surface of the male member into a gentle pattern of annular ridges and valleys which prevent withdrawal of the male member from the body. At the same time, the wedging of the front and back ferrules tightly between the surface of the male member and the surfaces of the respective tapered mouths establishes a seal effective against extremely high pressures and ultra-high vacuums as well.

Swage action gripping devices of the general type as that here involved are not, in and of themselves, new to the trade. In fact, devices operating on this principle have received notable acceptance in the industry because they afford several rather remarkable advantages.

Probably the most commendable aspect of swage action gripping devices generally is that they may be used effectively to seal and grip plain end male members at extremely high pressures. This aspect, in turn, may result in part from the fact that such devices do not grip by biting into the surface of the member to be coupled, and therefore do not score or weaken such member.

Swage action gripping devices also offer many other advantages, more ancillary in nature than the extremely favorable sealing and gripping characteristics. Significant among these is that such gripping devices lend themselves to shipment to the job site in the assembled condition with the coupling nut in finger tight threaded engagement on the body and with the front and back ferrules aligned and clamped between the nut and the tapered mouth of the body.

To join the gripping device to a male member at the job site, it is then necessary only to insert the member into the assembled gripping device and tighten the coupling nut a predetermined number of turns. This avoids the necessity, common with other types of gripping devices, of disassembling the device so that the various coupling components may be mounted one at a time upon the member to be joined with the coupling body.

Notwithstanding the favorable aspects generally of gripping devices of the type described, swage action couplings have not been free from certain shortcomings. To a considerable extent, the successful operation of couplings of the type here involved depends upon controlled constriction or swaging of the wall of the member to be coupled. Obviously, a force of appreciable magnitude is required to accomplish deformation of this sort. A difficulty of no mean consequence lies in the fact that heretofore only a small portion of the input torque has gone toward accomplishing swaging of the male member. It has been estimated that in prior art couplings fully as much as three-quarters of the input torque is lost in deforming the front and back ferrules and in galling, and heating of adjacent surfaces of relatively movable coupling components.

For quite some time, the seriousness of the torque loss problem was not fully appreciated because, in the case of tube joining applications, for example, the male member in the majority of instances was fabricated from relatively soft thin wall material, such as copper, the deformation of which required little effort. Therefore, the collateral loss of a considerable amount of input torque could be occasioned without rendering take up of the coupling impossible.

With the recent expanded use of heavy wall tubing and tubing materials of increased strength characteristics, occasioned by the wide-spread high pressure applications in process work, instrumentation, and space technology, the inapplicability of conventional concepts to the solution of gripping problems became evident. The force required to swage the wall of the tubing in such instances became increased to the degree that, when added to that lost collaterally, it became all but impossible to accomplish swage type joints in a commercially feasible manner. It was discovered, for example, that the torque required to take up a prior art swage action gripping device on a one inch stainless steel tube was approximately 380 foot-pounds. To deliver by hand the requisite torque, it was accordingly necessary to utilize a wrench with a six or seven foot handle extension. The undesirability of such a necessity is self-evident.

Still another perplexing problem which has troubled the makers of swage action gripping devices lies in obtaining proper control over the timing of the various sequential movements of the front and back ferrules along their respective tapered camming mouths and against the surface of the tubing. The correctness of the time sequence relationship between the various progressive phases of front and back ferrule movement is indispensable to optimum gripping and sealing. Ideally, the front ferrule should accomplish most of its forward and inward motion before contraction of the back ferrule begins. Unfortunately, however, the factors which affect timing correctness are in delicate balance, and only very little is required to upset this balance and disrupt gripping and sealing performance.

Even a slight galling or seizing between the front ferrule and the tapered camming mouth within which it fits may be sufficient to retard its forward movement. Resistance, therefore, builds up too rapidly and the back ferrule begins to contract prematurely. As a consequence, the degree of front ferrule movement required for optimum gripping and sealing is never achieved, and since the forward sleeve is the component from which primary gripping and sealing is derived, a defective joint results.

On the other hand, galling or binding between the back ferrule and its associated tapered camming mouth retards contraction of the back ferrule. This, in turn, may cause the front ferrule to be driven too far forwardly, resulting in an improper seal or grip. It may also prevent the rear ferrule from performing the secondary gripping and sealing action for which it is responsible. When the delicacy of the balance between the many factors which affect ferrule movement is considered, it is not at all surprising that a common shortcoming of prior art devices of the type described has been an inability to exercise the requisite degree of control over the time sequence of ferrule movement phases. Accordingly, consistency of performance has not always been available with commercial swage action gripping devices.

With the foregoing problems in mind, it is a general object of the invention to provide an improved swage action gripping device useful in connection with high pressure applications.

It is a more specific object of the invention to provide a gripping device of the type described characterized particularly by its adaptability to effective performance either with heavy wall tubing of relatively high strength characteristics, or with thin wall, lower strength tubing.

It is a further object of the invention to provide a swage action gripping device of the type described having means to insure properly timed, coordinated sequential movement of the gripping ferrules during take up.

It is still another object of the invention in a swage action gripping device of the type described, to provide means to convert a more substantial percentage of the input torque to useful purposes than has heretofore been possible, and thereby to increase the ease with which take up of the gripping device may be accomplished.

Other and more specific objects of the invention will be apparent from the detailed description to follow.

Broadly, the present invention contemplates the application of certain novel concepts to swage action coupling design, thereby to improve the character of the ferrule movement, and in this way to reduce torque loss and insure proper coordination between the various progressive phases which occur during take up of a gripping device embodying the principles of the invention.

More particularly, the invention contemplates an adjustment in the angularity of various interfaces of the gripping device to cause direction of the effective components of force in such a way as to counteract the natural tendency of the ferrules, when under compression, to expand radially into binding engagement with the coupling nut. The counteraction of these natural tendencies contributes markedly to conversion of a greater percentage of input torque to swaging of the male member, and at the same time to improvement of the character of the forward driving action upon the back ferrule particularly. Moreover, it has been found that such an adjustment favorably affects the time sequence between the various phases of back ferrule movement, in that it tends to prevent premature initiation of rear ferrule swaging action.

It has further been discovered that surprising improvement in ferrule movement coordination can be obtained by very carefully controlling the surface finish characteristics of the interfaces between relatively movable parts, and especially of the interfaces between the ferrules and the tapered camming mouths against which they act. By so doing, movement of the ferrules along the surfaces of the camming mouths is smooth and unretarded with the result that the gripping action of each ferrule takes place at exactly the time necessary to insure optimized holding and sealing power.

The exercise of surface finish control in the zones previously mentioned also produces a favorable increase in the percentage of input torque which is converted to useful purposes. A further increase is obtained by improving the quality of the finish on the frictional surfaces of the threads on the coupling body and nut. A kindred improvement is to be found in decreased tolerances between male and female threads, which has the effect of distributing load more evenly over the full number of contact threads, causing a reduction in galling or seizing of the parts at the thread interface.

Figure 1:
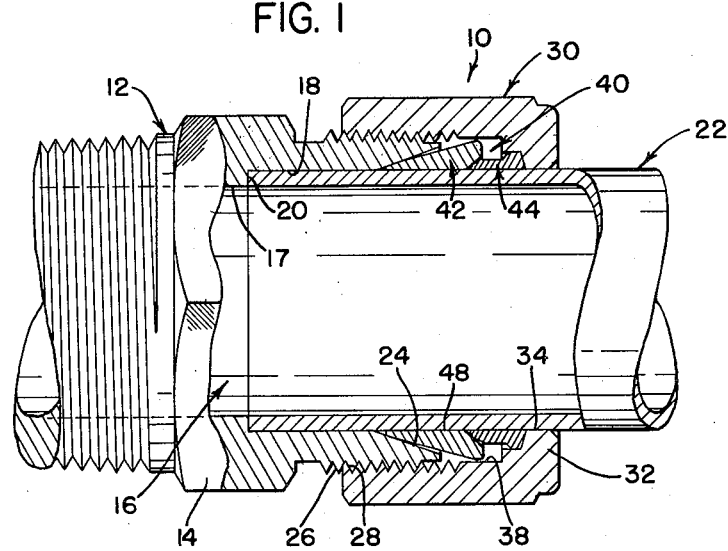
FIG. 1 is a fragmentary view, partly in longitudinal section, of a swage action gripping device embodying the principles of the invention.
Figure 2:
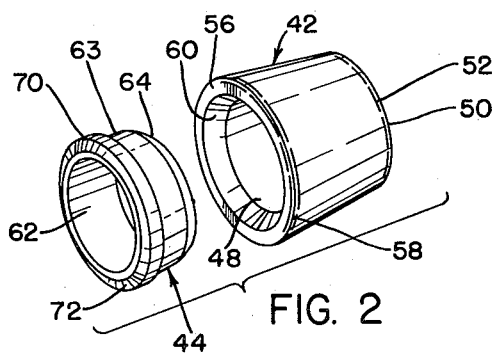
FIG. 2 is an exploded perspective view of the front and back ferrules which make up a part of the gripping device of FIG. 1.

Referring now more particularly to the drawings, FIG. 1 shows a controlled phase sequential gripping device indicated generally at 10 embodying the principles of the invention. The gripping device 10 includes a coupling body 12 which may be provided intermediate its ends with tool pads 14 or other wrench engaging surfaces. Extending longitudinally through the body 12 is a substantially cylindrical passageway indicated generally at 16.

In those instances in which the male member to be gripped is a tube or the like, the passageway 16 is provided at one end with a coaxial counterbore 18 having a bottom forming a radially extending shoulder 20 for engagement with the end of a tube 22. When used for gripping thermocouples or other rod-like male members adapted to extend more or less completely through the coupling, the counterbore 18 would be omitted and the passageway 16 would be of substantially constant diameter from end to end. As will be noted in the illustrated embodiment, the relative diameters of counterbore 18 and the adjacent portion 17 of the passageway 16 are such as to provide a smooth transition between the inside diameter of the tube 22 and the smaller diameter section of the passageway 16, thereby to reduce turbulence of fluids passing through the gripping device.

The counterbore 18 at its outer terminal portion is provided with a coaxial annular tapered or frustoconical camming mouth 24, which is formed on an included angle of from about 30° to about 58°, the preferred included angle being about 40° in magnitude.

In the form of the invention shown in the drawings, the coupling body 12 is provided, on the end portion thereof in which the tapered annular mouth 24 is formed, with male thread means 26 for mating engagement with female thread means 28 provided on coupling nut 30. It has been found that much improved driving characteristics and appreciable reduction in galling can be obtained by producing the male threads with no looser than a class 3 fit and the female threads with no looser than a class 2 fit, although in actual practice, a class 3 fit is usually obtained on the female threads as well. This represents a somewhat closer fit than has been used prior to this time in connection with swage action gripping devices. The effect of a tighter fit is to reduce the tendency of load during take up to be carried by only the first few threads, and instead results in a relatively even load distribution over the full number of engaged threads. The unthreaded end of the coupling nut 30 is formed with an internal annular flange 32 defining a generally cylindrical opening 34 coaxial with and of approximately the same diameter as the counterbore 18.

The lateral face of the flange 32 opposed to the annular tapered mouth 24 forms a frusto-conical driving or thrust surface 36 coaxial with both the mouth 24 and the counterbore 18. In practice, it has been found that best performance is achieved when the included angle formed by the frusto-conical driving or thrust surface 36 ranges from approximately 130° to 170° with an included angle of about 150° being preferable.

In the embodiment illustrated, the driving surface 36 is separated from the female thread means 28 by an annular stepped internal surface 38, although through the range of smaller diameter sizes in which such devices are usually made, the surface 38 is not, for manufacturing purposes, normally stepped.

It will be observed that the annular tapered camming mouth 24, the internal surfaces of coupling nut 30 and the external surface of the male tube 22, together define an annular chamber 40 within which the front and back ferrules 42 and 44 respectively are adapted to be received.

The configuration of the front ferrule 42 is that of a hollow right circular conical frustum having an axial length appreciably greater than that of tapered camming mouth 24 and providing a smoothly tapered annular external surface 46 and a generally cylindrical axial bore 48 of a size to fit slidably upon male member 22. As will be observed, the diameter of the ferrule bore 48 in undeformed state is substantially the same as both that of portion 17 of passageway 16 and that of opening 34. For optimum performance the tapered external surface should be formed on an included angle of from about 20° to about 40° with an included angle of about 30° being preferred. In any event, it has been found highly desirable to maintain the included angularity of the tapered surface 46 at a value about 10° less than that of the tapered camming mouth 24.

The forward terminus of the front ferrule 42 defines a generally flat radial front face 50 which is merged with tapered surface 46 by a smoothly curved apical zone 52 formed on a radius of from about 0.002 to about 0.018 inch, with a radius of from about 0.005 to about 0.012 inch being preferred for good results. The forward end of the front sleeve 42 is so proportioned that the apical zone 52 is adapted initially to seat against the annular tapered camming mouth 24 along substantially a line adjacent the junction 54 between counterbore 18 and mouth 24, but spaced therefrom by a distance not exceeding approximately one-third the total length of such mouth.

The rearward terminus of the front ferrule provides a generally flat radial base surface 56 joined to the tapered surface 46 by a smoothly curved surface 58 to reduce galling in the event that during deformation the front ferrule 42 should be expanded into engagement with the surface 38 of coupling nut 30. It should be noted also in this connection that the external diameter of the front ferrule 42 at its longest point is significantly smaller than the diameter of that portion of surface 38 which is opposed to such ferrule. This measure gives protection against binding between the ferrule and coupling nut under conditions of ordinary ferrule deformation.

The bore 48 of front ferrule 42 is joined to base surface 56 by an annular tapered or generally frusto-conical camming mouth 60 preferably formed on an included angle of about 90°, although a range of from about 70° to about 110° gives rise to satisfactory results. Obviously, the angular magnitude of camming mouths 24 and 60 affects significantly the particular moment at which the gripping action of each ferrule is initiated. It will be evident from an examination of the drawings that the radial extent of camming mouth 60, at its intersection with base surface 56, is about equal in magnitude to half the greatest difference between the inner and outer diameters of the front ferrule.

It is essential, as pointed out herein above, that the front ferrule 42, as the primary gripping and sealing element, accomplish during take up the major portion of its swaging movement before contraction of the back ferrule 44 begins. For this action to be obtained, the angularity of camming mouth 24 should always be somewhat less than that of camming mouth 60, so that during take up initial resistance to inward radial movement of the front ferrule is less than resistance offered to similar movement of the back ferrule.

The back ferrule 44, as will be seen, is an annular element roughly half the length of the front ferrule 42 and providing a central longitudinally extending bore 62 of about the same diameter as that of the bore 48 when both ferrules are undeformed. The external surface of the back ferrule is generally cylindrical throughout its mediate section 63, but provides a tapered or frusto-conical surface 64 at its forward end portion adapted to be received within the tapered camming mouth 60. Review of the drawings indicates that the diameter of the mediate section 63 has a magnitude which falls within the diametral range defined by the intersection of the second camming mouth 60 with radial base surface 56 and by the line along which apical zone 52 of the front ferrule engages the first camming mouth 24.

The tapered surface 64 is preferably formed on an included angle of from about 50° to about 90°. Best performance is obtained when such angle is maintained at a value about 20° smaller, on the included angle, than that of the mouth 60, such that the angular magnitude of the surface 64 would be preferably on the order of about 70° and may range up to about 90°. The axial length of the tapered surface, as shown in the drawings, is for the most satisfactory performance, assigned a value sufficiently smaller than that of the mouth 60 so that all, or nearly all, of such surface is received within the mouth when parts are assembled in hand tight condition.

The front terminus of the back ferrule 44 provides a generally flat radial front face 66 merged with the tapered surface 64 by a smoothly curved apical zone 68 formed on a radius of from about 0.005 to about 0.020 inch. For best driving action, it has been discovered that the magnitude of the radius of apical zone 68 should be at least equal to and preferably slightly greater than that of apical zone 52, and variations of each within preferred ranges should be made with this in mind. From the drawings it will be observed that the apical zone 68 of the back ferrule is adapted to seat against second camming mouth 60, along a line adjacent, but spaced from the smaller diameter end of such mouth. It will be observed that the diameter of the line along which zone 68 contacts mouth 60 is slightly larger than that of the line along which the front ferrule and first camming mouth abut.

The rearward end portion of the back ferrule is formed with an annular external radially extending flange 70 which presents a tapered or generally frusto-conical back face 72 opposed to and adapted to mate with surface 36 of the nut 30. While back face 72 of ferrule 44 is preferably complementary to the thrust surface 36, a variation of 4° to 6° on the included angle is permissible.

The angulation of thrust surface 36 and back face 72 is important for several reasons, one of which certainly is the self-aligning feature which is imparted thereby to the back ferrule and coupling nut. Another is the improved force distribution which results from an increased contact area between the thrust surface 36 and the back face 72. Probably of foremost importance, however, is that the angulation of these surfaces causes the line of action of the force transmitted from the coupling nut 30 to the back ferrule 44 to be directed toward the longitudinal axis of the gripping device rather than parallel to it. This has the effect of eliminating the tendency of the rearward portion of the back ferrule to expand radially outwardly when subjected to the force resulting from take up of the coupling nut. Consequently, the possibility of binding between coupling nut and back ferrule is measurably reduced, and the nature of the forward driving action is improved.

A feature of considerable consequence in connection with the construction of the back ferrule is the generous length of the mediate section 63 which separates the annular flange 70 from the tapered surface 64. Heretofore it has been considered desirable for the flange on the back ferrule to engage the base surface of the front ferrule at the conclusion of take up to provide stop limit means for ascertaining when the joint is fully made up. In the present invention, however, provision is made for avoiding such engagement by so choosing the length of mediate section 63 that the parts are not brought into contact when the coupling nut 30 has been taken up the requisite amount to perfect a grip and a seal upon the male member 22.

In a commercial embodiment of the invention, the lead of the thread means 26, 28 is such that one and one-quarter turns of the coupling nut are required to advance the ferrules sufficiently to obtain optimum gripping and sealing at low and intermediate pressures. One and one-half turns proves particularly effective for use at pressures of somewhat higher order of magnitude. Accordingly, the length of mediate section 63 of back ferrule 44 would be such that the axial distance between the flange 70 and the base surface 56, when the coupling nut is hand tight on thread means 26, exceeds the product of the lead of the thread means multiplied by the requisite number of coupling nut turns to complete make up of the joint. Therefore, in the case of the commercial embodiment previously mentioned, this distance is at least slightly in excess of 5/4L, and preferably in excess of 3/2L, where L is the lead of the thread means by which the coupling nut is mounted to the coupling body.

The purpose of avoiding engagement between the flange 70 and base surface 56 is to preserve after make up the inherent resiliency or elasticity of the back ferrule in order that the same may give rise to a lock washer effect by exerting against the thrust surface 36 a continuous, yielding pressure which reduces the susceptibility of the coupling nut 30 to loosening when subjected to vibration. Obviously, most of the inherent resiliency of the back ferrule would be lost if the flange 70 were to be butted firmly against base surface 56, and consequently the lock washer effect would be negligible or altogether lacking.

To the end that the back ferrule may initially be possessed of substantial elasticity or resiliency, its wall thickness is considerably less than that of the front ferrule at its largest point. In the illustrated embodiment, for example, the wall thickness of the back ferrule at its mediate section 63 is roughly half that of the front ferrule at its zone of largest diameter, although this relationship varies somewhat through the size range in which devices according to the invention are made.

The relative wall thicknesses of the front and back ferrules are of additional importance insofar as properly timed and coordinated sequence of ferrule movement phases are concerned. It has been found that on the one hand if the wall thickness of the back ferrule is too great in comparison to that of the front ferrule, the back ferrule has a tendency to begin its radially inward movement too late. Further, the rearward portion of the front ferrule may be forced radially outwardly into binding engagement with the coupling nut, causing undue interference with the swaging action. On the other hand, if the wall thickness of the back ferrule is too small in comparison with that of the front ferrule, the back ferrule tends to stop driving and begins swaging prematurely, i.e., before the front ferrule has been driven forwardly a sufficient distance to perfect an optimum primary seal and grip upon the male member.

Of material importance to properly coordinated gripping sequence is the relationship between the external diameter of mediate section 63 and the diameter of mouth 60 at its juncture with base surface 56. The diameter of the former has been illustrated as being somewhat smaller in magnitude than the latter, and in any event, should not be larger. This relationship contributes to smooth and unretarded movement of the forward terminus of the back ferrule along the camming mouth 60 and into gripping engagement with the external surface of the male member. Should the external diameter of section 63 be appreciably larger in size than that of the juncture between camming mouth 60 and base surface 56, an interference during take up usually occurs between such juncture and the merger zone of tapered surface 64 and mediate section 63, thereby retarding proper radial movement of the back ferrule. The possibility of interference of this type is avoided in the present invention by reason of the diametral relationship discussed herein above.

In order of degree of importance to the improved performance of a gripping device embodying the principles of the invention, the controlled surface finishes with which various coupling interfaces are provided ranks high. It has been found that by carefully controlling the surface finish characteristics of certain components, sharply improved ferrule movement coordination can be obtained, as well as a reduction or elimination of galling, conversion of a higher percentage of input torque to swaging action, and enhanced sealing characteristics.

Of significance is the beneficial effect of controlled surface finish upon timing and coordination of ferrule movement sequences. Already stressed has been the fact that for proper operation, it is essential for the movements of each ferrule to be free from interference in order to avoid either retarded or premature radial constriction and swaging. It is, therefore, essential that relatively translating coupling components be free from galling and binding. To the attainment of this end particularly, camming mouths 24 and 60 together with at least the external surfaces 46, 52 and 64 and 68 of the ferrules are provided with a controlled surface finish of extremely fine quality ranging from about 4 to about 32 microinches, with a finish of any lower number being preferred. This represents about the best quality available on a commercially feasible basis, and permits the front ferrule and back ferrules to move along their respective camming mouths as freely as possible during take up. Of course, in certain instances, it may be desirable to provide additional external surfaces of the ferrules with a controlled finish as well.

To improve the character of the forward drive on the ferrules, and to reduce galling between coupling nut and back ferrule, it has been discovered helpful to provide thrust surface 36 and back face 72 with a controlled surface finish of from about 8 to about 63 microinches. The quality of the finish on these surfaces is not quite as fine as that on the camming mouths and the portions of the ferrules that associate therewith, primarily because surface 36 and face 72 are not required to perform a sealing function.

Further to improve anti-galling and torque conversion characteristics, the frictional surfaces of thread means 26, 28 are provided with a surface finish of from about 4 to about 32 R.M.S. (root mean square). The R.M.S. unit is recognized as a standard unit for measuring surface roughness. The R.M.S. value for a given surface may be measured mechanically by an instrument known as a profilometer, available from any of several manufacturers. This permits the coupling nut 30 to be moved along the thread means without binding and contributes to the ease with which the joint can be made up.

Gripping devices of the type herein described are shipped to the job site with the ferrules 42 and 44 in position and the coupling nut 30 hand tight on the thread means 26, 28. When it is desired to make a joint, a suitable male member of appropriate size is inserted through the opening 34 and bores 62, 48 into the passageway 16, and more particularly into the counterbore 18 if the male member involved is a tube. Subsequently, the coupling nut is taken up the requisite number of turns to perfect a grip and seal upon the member to be joined to the gripping device.

Figure 3:
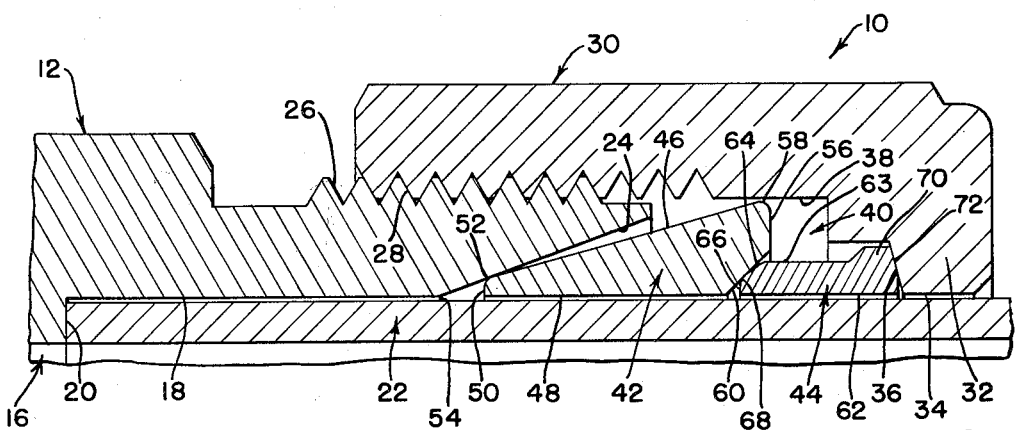
FIG. 3 is an enlarged fragmentary view, in longitudinal section, of the gripping device of FIG. 1, in which the coupling nut is in finger tight relationship with the male threads on the coupling body.

In the illustrated embodiment, a device has been shown requiring one and one-quarter to one and one-half turns of the coupling nut to make the joint, the precise number of requisite turns being dependent upon the pressures with which the device is to be used and the lead of the thread. The relative position of the various coupling components in the hand tight "start" position is shown in FIG. 3.

Figure 4:
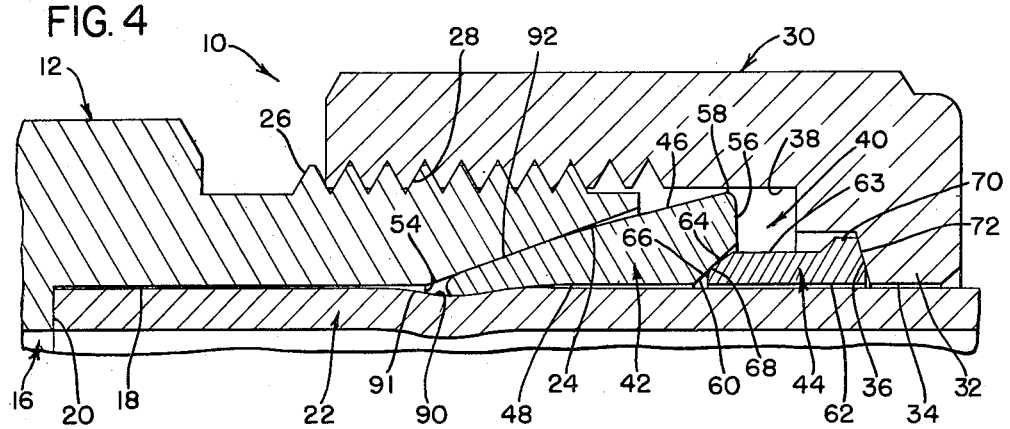
FIG. 4 is an enlarged fragmentary view, in longitudinal section, of the gripping device of FIG. 1, showing the relative positions of the components during the initial stages of take up.

During the first half-revolution, as illustrated in FIG. 4, the back ferrule functions primarily as a driving member by which thrust is transferred from the coupling nut 30 to the front ferrule 42. As such, the back ferrule initially advances along the surface of the tube 22 without constricting, thereby to force the front ferrule against the tapered or frusto-conical camming mouth 24. As a consequence of its forward movement, the front ferrule is progressively wedged or cammed radially inwardly into swaging engagement with the surface of the tube as at 90, flowing the material of the tube forwardly as at 91. At the same time, the initial line contact between apical zone 52 and camming mouth 24 spreads into an area engagement as at 92. It is thought that initially the back ferrule 44 may rotate with the coupling nut 30 for a fraction of a turn; however, as pressures build up rotation of such ferrule is thought to stop, such that it and the coupling nut subsequently rotate relative to one another.

Figure 5:
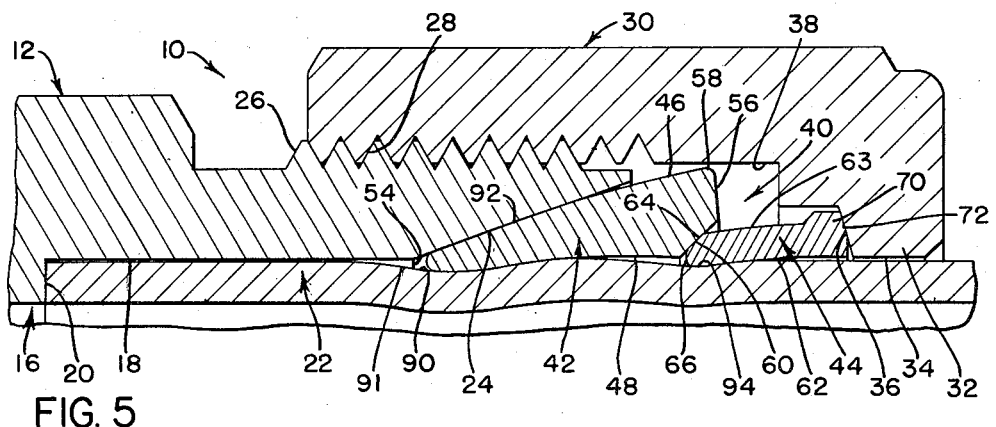
FIG. 5 is an enlarged fragmentary view, in longitudinal section, of the gripping device of FIG. 1, showing the relative positions of the components when take up is somewhat more than half completed.

During about the next one-quarter of a revolution, as illustrated in FIG. 5, the front ferrule continues to move forwardly and inwardly, but at a reduced rate as a result of the increasing resistance exerted by the surface of the tube and the camming mouth 24. As resistance to movement of the front ferrule continues to build up, and the rate of front ferrule movement slows, the stiffness of the back ferrule is gradually overcome, as a result of which surface 64 is brought into area engagement with mouth 60, and progressive inward wedging or camming of the forward end of the back ferrule into swaging engagement with the surface of the tube as at 94 is commenced.

Figure 6:
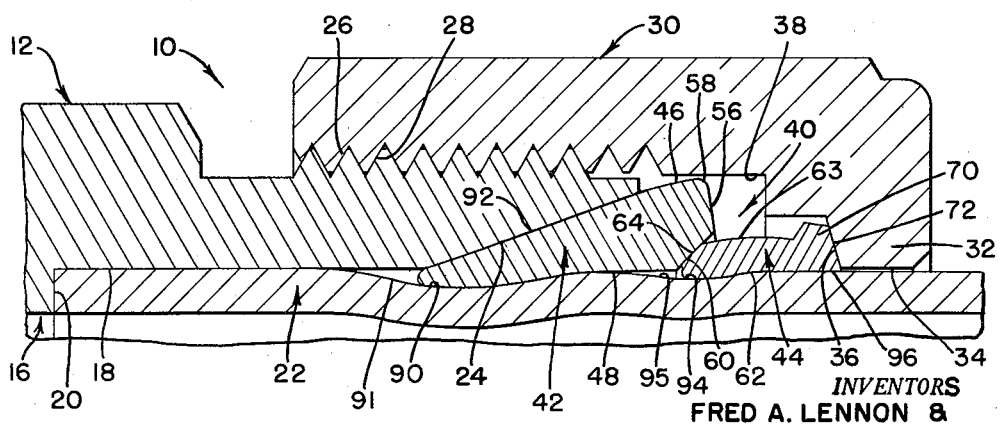
FIG. 6 is an enlarged fragmentary view of the gripping device of FIG. 1, showing the relative position of the components when take up is complete.

As seen in FIG. 6, during the final one-half to three-quarters of a revolution, as the case may be, forward and inward motion of the front ferrule falls off rapidly, and the drive of the coupling nut is translated almost entirely to inward movement of the back ferrule against the tube surface, flowing tube material forwardly as at 95, until ultimately the ferrules are completely seated as shown. Usually the rearward portion of the back ferrule may dip inwardly slightly into snug area engagement with the tube as at 96. This is considered generally to be a collateral effect and is not necessary to optimum gripping and sealing characteristics.

Experience has shown that once a gripping device embodying the invention has been joined to a male member, the joint may be made and remade a number of times without materially impairing performance. This is considered to be in part due to the previously described lock washer action of back ferrule 44.

For ease of description, the principles of the invention have been set forth in connection with but a single illustrated embodiment, showing a body with male threads and a coupling nut with female threads. It is not our intention that the illustrated embodiment nor the terminology employed in describing it be limiting, inasmuch as variations in these may be made without departing from the spirit of the invention, as for example by utilizing male coupling nut threads and female body threads. Rather, we desire to be restricted only by the scope of the appended claims.

We claim:
1. A phase controlled sequential gripping device for a male member having a substantially cylindrical external surface, said device comprising a coupling body having a passageway for receiving the male member, said passageway being substantially cylindrical throughout a portion of its length and being provided with a first coaxial rearwardly opening, generally frusto-conical camming mouth of predetermined axial extent adapted to surround the male member when inserted in the coupling body, said camming mouth forming a predetermined forwardly extending angle with respect to the axis of the passageway; a front ferrule adapted to be snugly received upon the male member and having substantially the form of a cylindrically hollow, right circular forwardly converging conical frustum providing a bore coaxial with said passageway, a tapered external surface having an axial length greater than that of the first camming mouth and defining an angle with respect to the axis of said passageway less than that defined by the camming mouth, the tapered surface terminating at the forward end of the front ferrule with a curved apical zone seated against the first camming mouth in initial non-pressure contact along a line of predetermined diameter and adjacent to but spaced from the smaller end of the first camming mouth, said curved apical zone being joined to the bore of the front ferrule by a generally flat radially extending front face, the front ferrule being provided at the rearward end thereof with a second coaxial rearwardly opening generally frusto-conical undercut camming mouth joining the radial base with the bore of the front ferrule, said second camming mouth having a radial extent, at its intersection with the radial base, about equal to half the greatest difference between the inner and outer diameters of the front ferrules; a back ferrule adapted to be snugly received upon the male member adjacent the front ferrule and rearwardly thereof, the back ferrule being in the form of an annular sleeve providing a bore coaxial with said passageway and having a wall thickness materially less than the greatest wall thickness of the front ferrule, the forward end of the sleeve having an external forwardly converging generally frusto-conical surface received within the second camming mouth, the frusto-conical surface of the back ferrule being formed on an angle less than that of the second camming mouth and terminating at the forward end of the back ferrule with a curved apical zone seated against the second camming mouth in initial non-pressure contact along a line of greater diameter than that along which the front ferrule and first camming mouth contact one another and adjacent but spaced rearwardly from the forward smaller end of the second camming mouth, the rearward end of the back ferrule being provided with an annular radially outwardly extending flange providing a coaxial generally frusto-conical rearwardly converging back face, the annular flange and the generally frusto-conical external surface of the back ferrule being joined by an annular mediate section of substantially uniform diameter throughout, the diameter of the mediate section having a magnitude falling within the diametral range defined by the intersection of the second camming mouth with the radial base surface, and by the line along which the apical zone of the front ferrule contacts the first camming mouth; a coupling nut threadedly engaged with the body and provided with a coaxial internal rearwardly converging generally frusto-conical thrust surface disposed in axially spaced opposition to the first camming mouth and engaging the back face of the annular flange, the coupling nut and first camming mouth together defining an annular chamber surrounding the male member, when inserted in the coupling body, within which the front and back ferrules are received with radial clearance between such ferrules and the coupling nut at normal torque loads, the first and second camming mouths together with the frusto-conical surfaces of the front and back ferrules being provided with a controlled surface finish of from about 4 to 32 microinches, the relationship of the above parts being such that upon initial torquing of the coupling nut, the back ferrule exerts a substantially axial thrust against the front ferrule to cause a major part of the total front ferrule deformation to be accomplished prior to the time deformation of the back ferrule is initiated.

2. A phase controlled sequential gripping device as defined in claim 1 in which the difference between the included angle defined by the frusto-conical surface of the front ferrule and its camming mouth is about 5 degrees with respect to the axis of the passageway, and that defined by the frusto-conical surface of the back ferrule and its camming mouth is about 10 degrees with respect to the axis of the passageway.

3. A phase controlled gripping device as described in claim 1 in which the thrust surface of the coupling nut and the back face of the annular flange are formed on an included angle of from about 65 to 85 degrees with respect to the axis of the passageway.

4. A phase controlled sequential gripping device as defined in claim 1 in which the curved apical zone of the back ferrule is formed on a radius greater than that of the curved apical zone of the front ferrule.

5. A phase controlled sequential gripping device as defined in claim 1 in which the thrust surface of the coupling nut and the back face of the annular flange are provided with a controlled surface finish of from about 8 to 63 microinches.

6. A phase controlled sequential gripping device as defined in claim 1 in which the threads interconnecting the coupling nut and the coupling body are provided with a surface finish of from about 4 to 32 R.M.S.

7. A phase controlled sequential gripping device as defined in claim 1 in which the axial distance between the annular flange and the line of contact of the back ferrule with the second camming mouth exceeds the total axial movement of the coupling nut required to effect fully a grip and seal upon the male member.

References Cited in the file of this patent
UNITED STATES PATENTS

| | | |
|---|---|---|
| 1,866,914 | Stover | July 12, 1932 |
| 2,484,815 | Crawford | Oct. 18, 1949 |